US010012289B2

(12) United States Patent
Tarrant et al.

(10) Patent No.: US 10,012,289 B2
(45) Date of Patent: Jul. 3, 2018

(54) FLYWHEELS FOR ENERGY STORAGE AND METHODS OF MANUFACTURE THEREOF

(71) Applicant: GKN Hybrid Power Limited, Worcestershire (GB)

(72) Inventors: Colin David Tarrant, Cheshire (GB); Mark Bailey, Norfolk (GB)

(73) Assignee: GKN Hybrid Power Limited, Worcestershire (GB)

( * ) Notice: Subject to any disclaimer, the term of this patent is extended or adjusted under 35 U.S.C. 154(b) by 0 days.

(21) Appl. No.: 14/905,975

(22) PCT Filed: Jul. 18, 2014

(86) PCT No.: PCT/GB2014/052204
§ 371 (c)(1),
(2) Date: Jan. 19, 2016

(87) PCT Pub. No.: WO2015/008088
PCT Pub. Date: Jan. 22, 2015

(65) Prior Publication Data
US 2016/0169323 A1 Jun. 16, 2016

(30) Foreign Application Priority Data

Jul. 19, 2013 (GB) .................................. 1312927.5

(51) Int. Cl.
*F16F 15/315* (2006.01)
*F16F 15/305* (2006.01)
*B60K 6/10* (2006.01)

(52) U.S. Cl.
CPC ........ *F16F 15/305* (2013.01); *F16F 15/3153* (2013.01); *B60K 6/105* (2013.01); *Y02E 60/16* (2013.01); *Y02T 10/6204* (2013.01)

(58) Field of Classification Search
CPC .......... F16F 15/18; F16F 15/305; F16F 15/31; F16F 15/3153; F16F 15/3156;
(Continued)

(56) References Cited

U.S. PATENT DOCUMENTS 3,788,162 A 1/1974 Rabenhorst et al.
4,207,778 A 6/1980 Hatch
(Continued)

FOREIGN PATENT DOCUMENTS

EP 0145182 A1 6/1985
EP 1077335 A1 2/2001
(Continued)

OTHER PUBLICATIONS

European Patent Office, International Search Report and Written Opinion of the International Searching Authority, International Application No. PCT/GB2014/052204, dated Oct. 2, 2014 (13 pages).
(Continued)

*Primary Examiner* — Adam D Rogers
(74) *Attorney, Agent, or Firm* — Wood Herron & Evans LLP

(57) ABSTRACT

A flywheel for kinetic energy storage and its construction using composite materials. The present invention provides a flywheel assembly having a longitudinal axis and comprising an annular rotor and a rotor support for coupling the rotor to an axial shaft, wherein the rotor comprises fibers in a matrix material, and a ring comprising fibers in a matrix material is mounted on the outer circumference of the rotor support and the rotor is mounted on the outer circumference of the ring, the rotor, rotor support and ring each having longitudinal axes which are coincident with the longitudinal axis of the assembly. The presence of the intermediate ring formed of a composite material assists in the fabrication of
(Continued)

the assembly and increases its durability by providing a suitable interface between the rotor and a rotor support.

41 Claims, 4 Drawing Sheets

(58) Field of Classification Search
CPC ..... B60K 6/105; Y02E 60/16; Y02T 10/6204; Y10T 74/2132
See application file for complete search history.

(56) References Cited

U.S. PATENT DOCUMENTS

| | | | |
|---|---|---|---|
| 4,266,442 A | 5/1981 | Zorzi | |
| 4,341,001 A | 7/1982 | Swartout | |
| 5,562,014 A * | 10/1996 | Waagepetersen | F16F 1/366 74/572.21 |
| 5,628,232 A | 5/1997 | Bakholdin et al. | |
| 5,816,114 A * | 10/1998 | Gregoire | F16F 15/305 464/87 |
| 5,871,117 A | 2/1999 | Protasov et al. | |
| 5,946,979 A * | 9/1999 | Waagepetersen | F16F 15/305 74/572.12 |
| 6,122,993 A * | 9/2000 | Morris | F16F 15/305 74/572.11 |
| 6,508,145 B1 * | 1/2003 | Gabrys | B32B 1/08 156/74 |
| 9,267,570 B2 * | 2/2016 | Spears | F16F 15/305 |
| 9,279,474 B2 * | 3/2016 | Tarrant | F16F 15/3156 |
| 2010/0018344 A1 * | 1/2010 | Spears | F16F 15/305 74/572.12 |
| 2010/0206126 A1 | 8/2010 | Spears et al. | |
| 2014/0265674 A1 * | 9/2014 | Kalev | H02K 5/04 310/71 |
| 2016/0153523 A1 * | 6/2016 | Tarrant | F16F 15/305 74/572.21 |
| 2017/0012489 A1 * | 1/2017 | Townend | H02K 7/025 |

FOREIGN PATENT DOCUMENTS

| | | | | |
|---|---|---|---|---|
| EP | 1199493 A2 | 4/2002 | | |
| GB | 2462671 A * | 2/2010 | ........... | F16F 15/315 |
| GB | 2469657 A | 10/2010 | | |
| JP | S55157734 A | 12/1980 | | |
| JP | H09506310 A | 6/1997 | | |
| JP | H09303485 A | 11/1997 | | |
| JP | 200055134 A | 2/2000 | | |
| JP | 2001227589 A | 8/2001 | | |
| JP | 2012524877 A | 10/2012 | | |
| WO | 9324765 A1 | 12/1993 | | |
| WO | 9615391 A1 | 5/1996 | | |
| WO | 9747898 A1 | 12/1997 | | |
| WO | 9809095 A2 | 3/1998 | | |
| WO | 2010020806 A1 | 2/2010 | | |

OTHER PUBLICATIONS

United Kingdom Intellectual Property Office, Patents Act 1977: Search Report under Section 17, Application No. GB1312927.5, dated Sep. 12, 2013 (1 page).
European Patent Office, International Search Report and Written Opinion of the International Searching Authority, International Application No. PCT/GB2014/052206, dated Oct. 2, 2014 (11 pages).
United Kingdom Intellectual Property Office, Patents Act 1977: Search Report under Section 17, Application No. GB1312932.5, dated Sep. 16, 2013 (2 pages).
Japanese Patent Office, Office Action, Japanese Patent Application No. 2016-526705, dated Apr. 24, 2018 (6 pages).

* cited by examiner

FLYWHEELS FOR ENERGY STORAGE AND METHODS OF MANUFACTURE THEREOF

CROSS-REFERENCE TO RELATED APPLICATIONS

This application is a submission under 35 U.S.C. § 371 of International Application No. PCT/GB2014/052204, filed Jul. 18, 2014, which claims priority to Great Britain Application No. 1312927.5, filed Jul. 19, 2013, the disclosures of which are hereby expressly incorporated by reference herein in their entireties.

FIELD OF THE INVENTION

The present invention relates to flywheels used for kinetic energy storage and more particularly the construction of such flywheels using composite materials.

BACKGROUND OF THE INVENTION

It is well known to use flywheels to store mechanical kinetic energy. The amount of energy stored depends on the mass of the flywheel and its speed of rotation. The kinetic energy of the flywheel is proportional to the square of its angular velocity. However, the amount of energy that may be stored in a given flywheel is dependent upon the robustness of the flywheel assembly and how it responds to the stresses experienced at high rotational speeds.

It is preferable to form flywheel assemblies from materials which are of low density and high specific strength. For use in, for example, hybrid vehicles or uninterruptable power supplies, energy storage flywheel assemblies need to operate at extremely high speeds, greater than 10,000 rev./min. or even more than 50,000 or 100,000 rev./min. Accordingly, there is considerable demand for flywheel assemblies that are able to operate at speeds of these orders.

U.S. Pat. No. 4,341,001 discloses a flywheel assembly comprising a metallic hub. The composite fibre rim is wound directly onto the hub.

SUMMARY OF THE INVENTION

The present invention provides a flywheel assembly having a longitudinal axis and comprising an annular rotor and a rotor support for coupling the rotor to an axial shaft, wherein:

the rotor comprises fibres in a matrix material, and a ring comprising fibres in a matrix material is mounted on the outer circumference of the rotor support and the rotor is mounted on the outer circumference of the ring, the rotor, rotor support and ring each having longitudinal axes which are coincident with the longitudinal axis of the assembly.

The presence of the intermediate ring formed of a composite material assists the fabrication of the assembly and increases its durability by providing a suitable interface between the rotor and the rotor support. The fibres of the ring may comprise at least one of glass fibres, basalt rock fibres and low specific modulus carbon fibres.

Preferably, the ring has a greater elasticity than the rotor in the circumferential direction. This allows it to be press fitted into the inner diameter of the rotor. Furthermore, it may also have a greater elasticity than the rotor support in the circumferential direction, so that it can be press fitted onto the outer circumference of the rotor support.

In preferred embodiments, the rotor support defines a substantially frusto-conical inner surface, which is rotationally symmetrical about its longitudinal axis. The angle defined by the frusto-conical inner surface with respect to a plane perpendicular to its longitudinal axis is selected so as to substantially strain match the rotor support with the ring. This ensures the integrity of the rotor support and ring assembly when subjected to centrifugal forces.

The outer circumferential surface of the ring may have a chamfer to assist fitting of the ring into the rotor. The chamfer may define a lead in angle of no greater than around 15° with respect to the longitudinal axis of the ring.

The rotor support and the ring may be configured such that an imaginary surface defined by outwardly projecting the frusto-conical inner surface of the rotor support extends through the ring from its inner circumferential surface to meet an outer cylindrical surface of the ring. As a result, forces exerted on the ring by the rotor support during rotation of the assembly are primarily directed through the outer cylindrical surface of the ring, avoiding any chamfers at its edges, for example, to optimize the load-bearing capability of the ring.

The outer circumferential surface of the rotor support and/or the inner circumferential surface of the ring may have a chamfer to assist fitting of the rotor support into the ring. Each chamfer may define a lead in angle of no greater than around 15° with respect to the longitudinal axis of the rotor support. This serves to avoid shearing of the corners of the ring as the end cap is press fitted into it.

The assembly may also include an inner annulus mounted on an inwardly facing surface of the rotor. The inner annulus may include particles of magnetic material to enable the assembly to be magnetically coupled to a stator.

The outer circumferential surface of the inner annulus and/or the inner circumferential surface of the rotor may have a chamfer to assist fitting of the annulus into the rotor. The chamfer may define a lead in angle of no greater than around 15° with respect to the longitudinal axis of the rotor.

A volume defined by the inner circumferential, cylindrical surface of the rotor, the chamfer of the rotor support and the chamfer of the inner annulus may be substantially filled with a bonding material. Otherwise, the presence of a void at this location will reduce the ability of the assembly to withstand high centrifugal forces. The bonding material may be a resin material, for example.

The edge at each end of the inner circumferential surface of the inner annulus may have a chamfer which defines an angle in the range 20 to 60° (or more preferably in the range 50 to 55° with respect to that surface, to avoid cracking of these edges at high rotational speeds.

The present invention also provides a method of manufacturing a flywheel assembly, the assembly comprising an annular rotor, a rotor support for coupling the rotor to a support shaft, and a ring, wherein the rotor and the ring comprise fibres in a matrix material, the ring is mounted on the outer circumference of the rotor support and the rotor is mounted on the outer circumference of the ring, the method comprising press fitting the rotor support into the ring.

BRIEF DESCRIPTION OF THE DRAWINGS

Embodiments of the present invention will now be described by way of example and with reference to the accompanying schematic drawings, wherein.

DETAILED DESCRIPTION OF THE INVENTION

Figure 1:
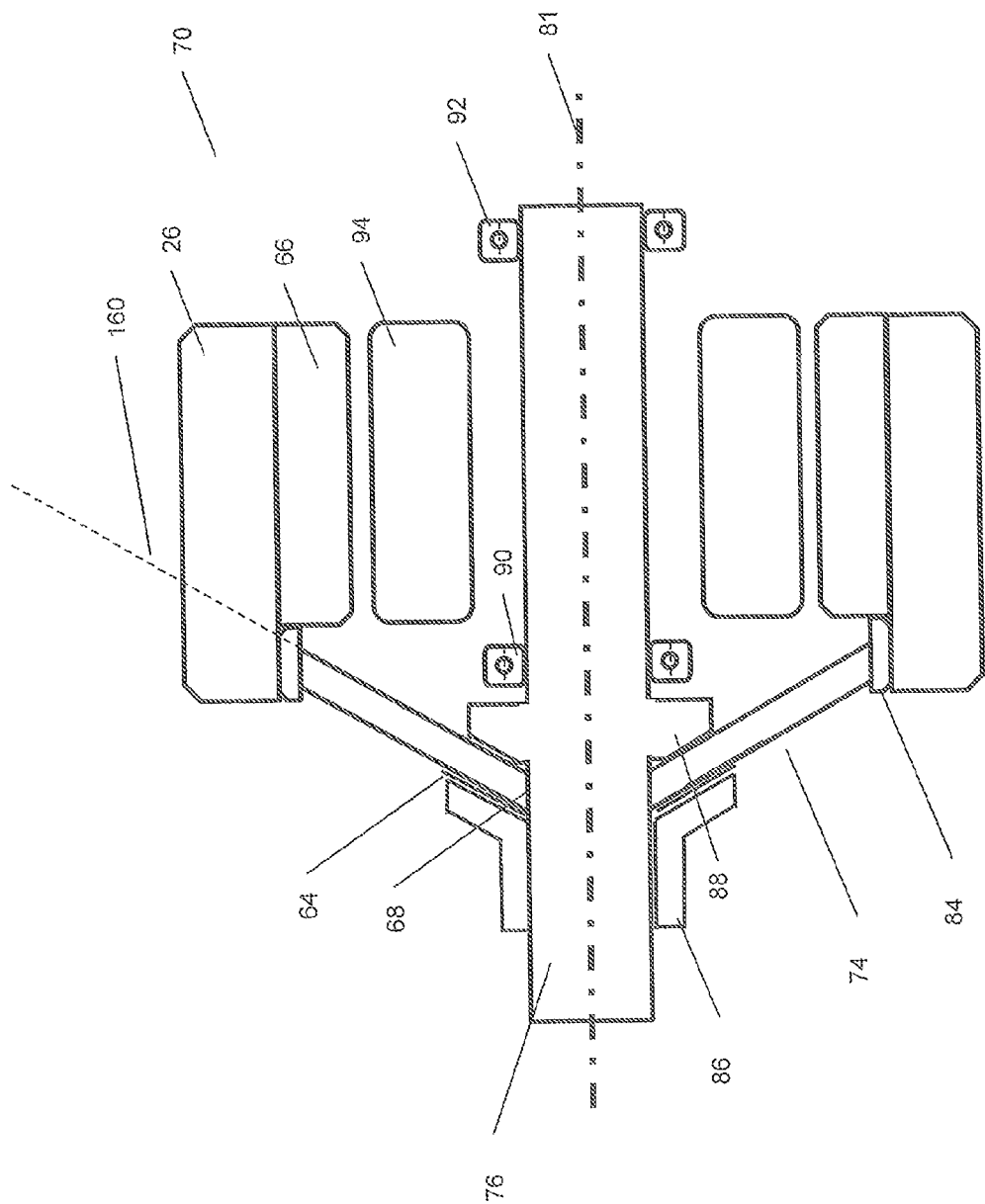
FIG. 1 is a cross-sectional side view of a flywheel assembly according to an embodiment of the present invention.

FIG. 1 illustrates a flywheel assembly 70 according to an embodiment of the present invention. It includes a rotor assembly having an annular outer rotor portion 26 and an inner annular rotor portion or annulus 66. The outer rotor 26 is formed of a composite material comprising unidirectional filaments of carbon fibres in a matrix of a resin material. The inner annulus 66 is formed of unidirectional filaments of glass fibre in a matrix formed of a mixture of resin and magnetic particles.

The rotor assembly is carried by a rotor support in the form of a hub or end cap 74. A ring 84 is provided between the end cap and rotor assembly in the radial direction, with the interfaces between the ring and the end cap and rotor assembly, respectively, overlapping in the axial direction. Preferably, the interface between the ring and the rotor entirely overlaps the interface between the ring and the end cap, in the axial direction. The end cap is generally conical in shape. Its outer circumference carries the ring 84 which is in turn attached to the outer rotor 26, on its inner cylindrical surface. The end cap extends outwardly in an axial direction from the rotor assembly and has a central circular opening 68.

A central shaft 76 extends through the opening 68 in the end cap. The shaft includes a circumferentially extending flange 88. The end cap is retained against the flange 88 by a clamping nut 86 which is threaded onto the shaft 76. An anti-fretting shim 64 is provided between the nut 86 and the end cap 74. The shaft is supported for rotation about a longitudinal axis 81 of the flywheel assembly by a pair of bearings 90 and 92. The bearings are in turn supported by a containment (not shown) for the flywheel assembly. The rotor assembly is rotatable about an electrical motor generator stator 94 carried by the containment.

A flywheel to be used to store energy in a vehicle may have an outer diameter of around 350 mm, with the inner diameter of the outer rotor being around 290 mm and the inner diameter of the inner annulus around 250 mm, for example.

The fabrication of the flywheel assembly shown in FIG. 1 will now be described with reference to the exploded view of FIG. 2. According to the present invention, the end cap 74, the ring 84, the outer rotor 26 and the inner annulus 66 are press fitted together. The components to be press fitted together are heated to around 60-70° C. prior to the press fitting process. Each of these press fitted components is formed of a composite material. The overlaps in the radial direction between press fitted surfaces to achieve the desired interference fits maybe somewhat larger than those typically used with metallic components. For example, the difference in the diameters of the inner and outer surfaces may be of the order of 0.25 mm to 0.85 mm. In addition the components are bonded together to further increase the strength of the assembly.

Preferably a resin coating is applied to the components to act as a lubricant during assembly which is then cured to produce a bond between the components.

A resin, for example, Hysol® EA 9394 as manufactured by Henkel Corporation, may be used as the lubricant and bonding agent.

During the fabrication process, the shaft 76 is inserted through the central opening 68 of the end cap. The end cap is secured in place on the shaft by the clamping nut 86. The outer circumference of the end cap is then machined as it is rotated about the longitudinal axis 81 of the assembly and shaft. The end cap 74 is precisely machined to the desired size. The glass fibre hoop wound ring 84 is then press fitted over the outer cylindrical surface of the end cap 74. This process is assisted by the bonding agent (such as a resin material 75) acting as a lubricant and provision of 15 degree lead in angles in the form of chamfers on the outer circumferential surface of the end cap and the inner circumferential surface of the ring. In this way, the two components can be fitted together without damage.

The end cap and glass ring combination is then pressed into the outer carbon hoop wound rotor 26. Again, this is assisted by the lubrication of a bonding agent (such as a resin material 77) and 15 degree lead in angles on the outer circumferential surface of the ring 84 and the inner cylindrical surface of the rotor 26. Then, the inner hoop wound magnetic composite annulus 66 is pressed into the carbon outer rotor 26, once again employing the bonding agent as a lubricant and assisted by 15 degree lead in angles on the outer circumferential surface of the annulus and the inner cylindrical surface of the rotor.

After press fitting, the components are heated to cure the bonding agent.

Chamfers are defined at each end of the inner cylindrical surface of the inner annulus 66. The chamfers preferably define angles with respect to the longitudinal axis 81 of at least 20 degrees, more preferably 20-60 degrees, and more preferably still 50-55 degrees, to avoid cracking of the edge at high rotational speeds.

Figure 2:
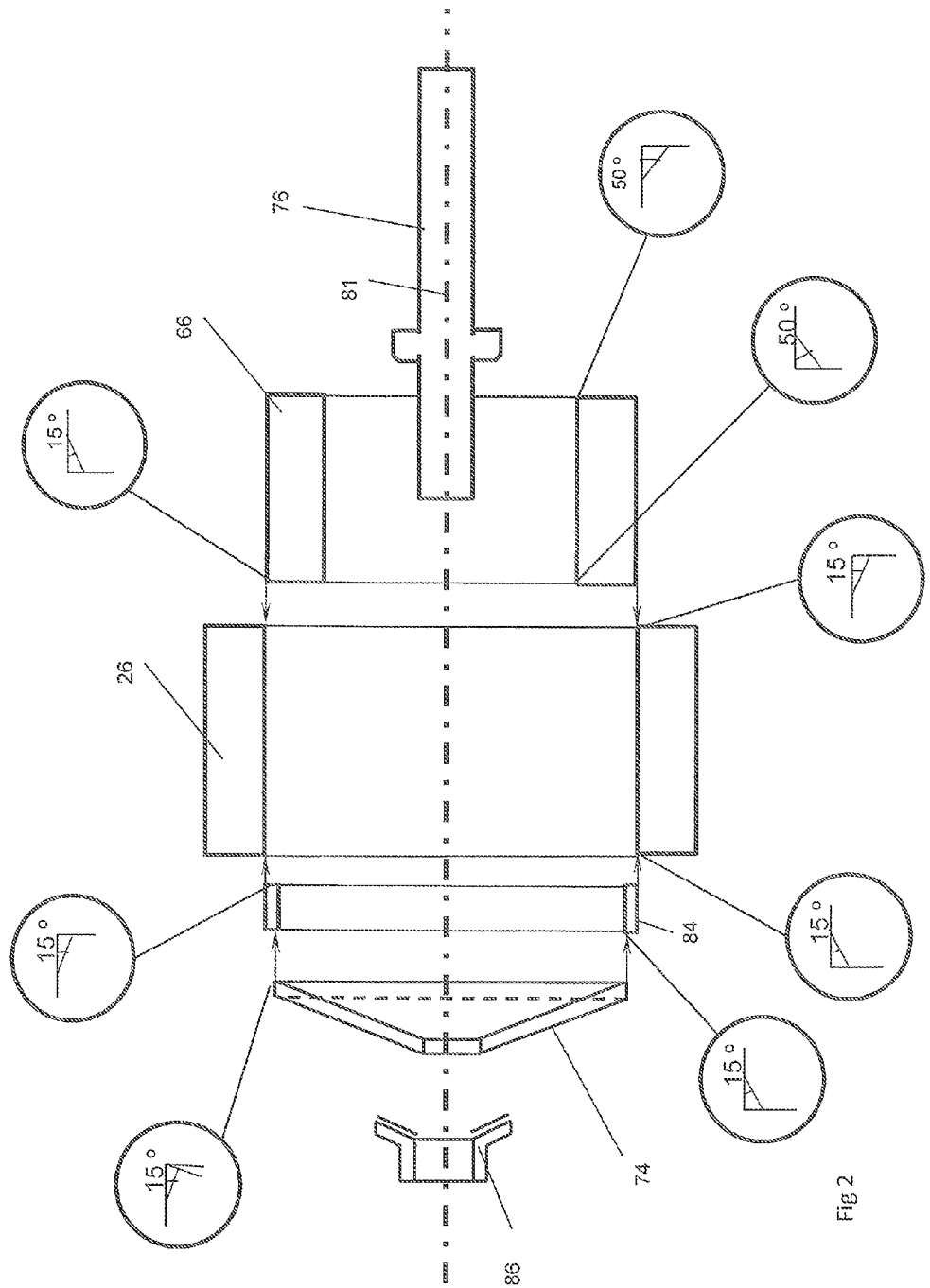
FIG. 2 is an exploded view of the flywheel assembly of FIG. 1.
Figure 3:
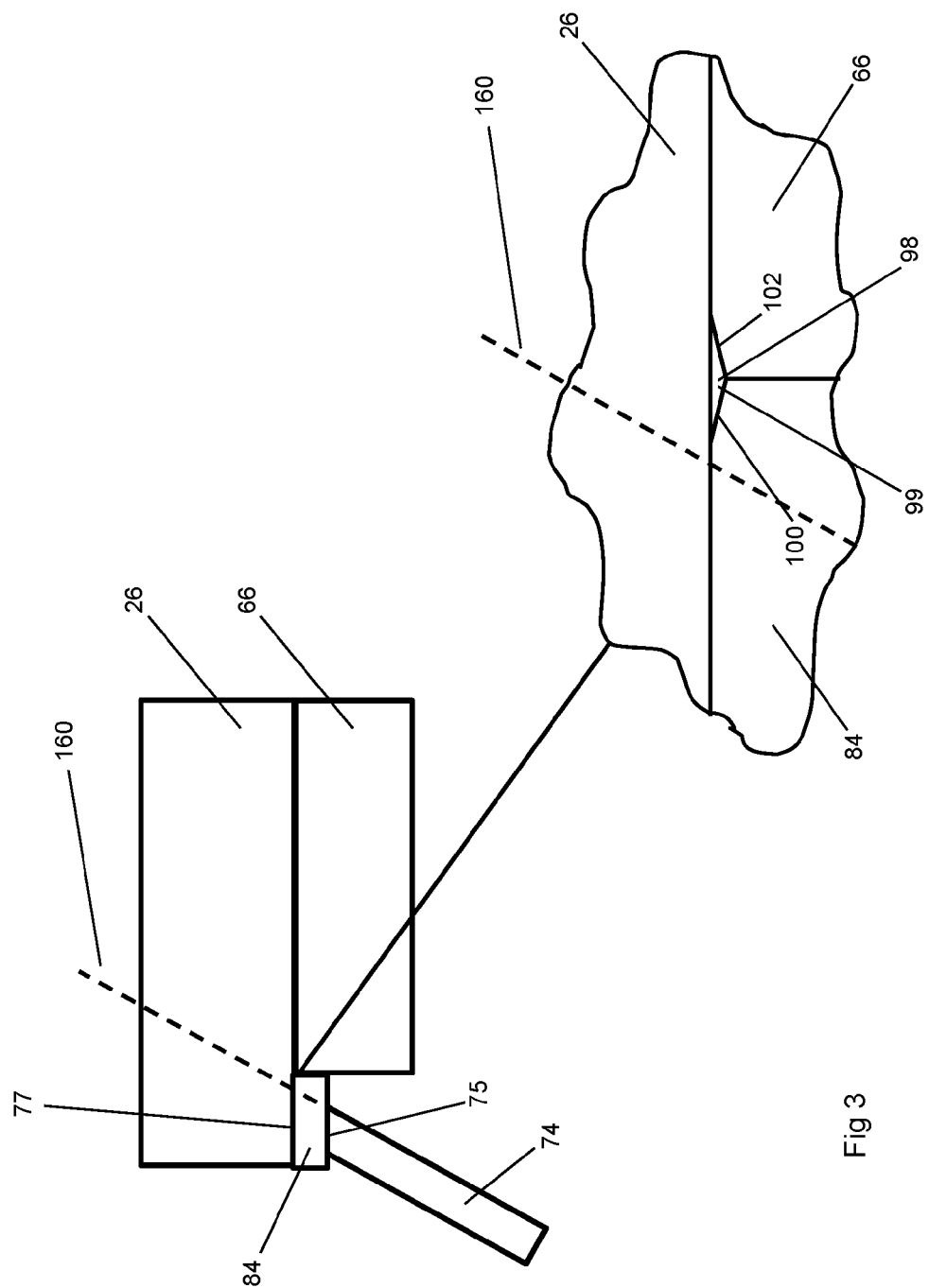
FIG. 3 is an enlarged cross-sectional view of a portion of the assembly of FIGS. 1 and 2, together with a further enlarged portion thereof.

An enlarged cross-sectional view of the rotor assembly shown in FIGS. 1 and 2 is illustrated in FIG. 3. Dashed line 160 is an imaginary line projecting the inner conical surface of the end cap 74 in an outward direction through the ring 84 and rotor 26. FIG. 3 also includes a further enlarged view of the location where this line intersects with the interface between the ring and the rotor. As discussed above, chamfers (labeled 100 and 102, respectively in FIG. 3) are formed on the outer circumferential edges of the ring 84 and annulus 66 to assist the assembly process. As a result, a volume 98 is defined between the outer rotor 26, the ring 84 and the annulus 66. To ensure that the outer edge of the end cap is fully supported by the ring 84, the assembly should be configured such that the projected line 160 intersects with the interface between the ring 84 and the outer rotor 26 at a location outside the volume 98. Furthermore, it is desirable to space this intersection from the volume 98, and the greater the spacing the better, subject to other configuration requirements. Preferably, the volume is filled with a bonding agent 99 during the assembly process to ensure that the full widths of the ring 84 and annulus 66 are supported by the outer rotor 26.

The rotor support or end cap 74 has a conical configuration such that it is strain matched with the surrounding ring 84. Its elastic deformation during rotation therefore substantially matches that of the ring to avoid separation during rotation at high speeds. The angle defined by the body of the rotor support relative to a plane perpendicular to its axis of rotation is preferably in the range 17-26 degrees, and more preferably around 20 degrees.

The ring 84 acts as a load-spreading intermediate member. It is tough enough to support the outer edge of the end cap. This avoids the end cap digging into or significantly fretting the surface of the outer rotor 26 and forming stress initiation points. A glass fibre-based composite may be used for the ring, for example.

During rotation, the end cap grows in diameter due to centrifugal force. In the absence of ring 84, the tough outer edge of the end cap would be forced into the relatively softer outer rotor, causing areas of high stress. This could lead to break up of the rotor at lower rotational speeds than would otherwise be the case.

The ring is preferably formed of a material having a greater circumferential (hoop) elasticity than the material of both the end cap and the outer rotor. This allows the ring to be press fitted (expanded) onto the end cap and then press fitted into the carbon rotor 26. The ring preferably has a higher radial compressive strength than the outer rotor and a lower radial compressive strength than the end cap.

Figure 4:
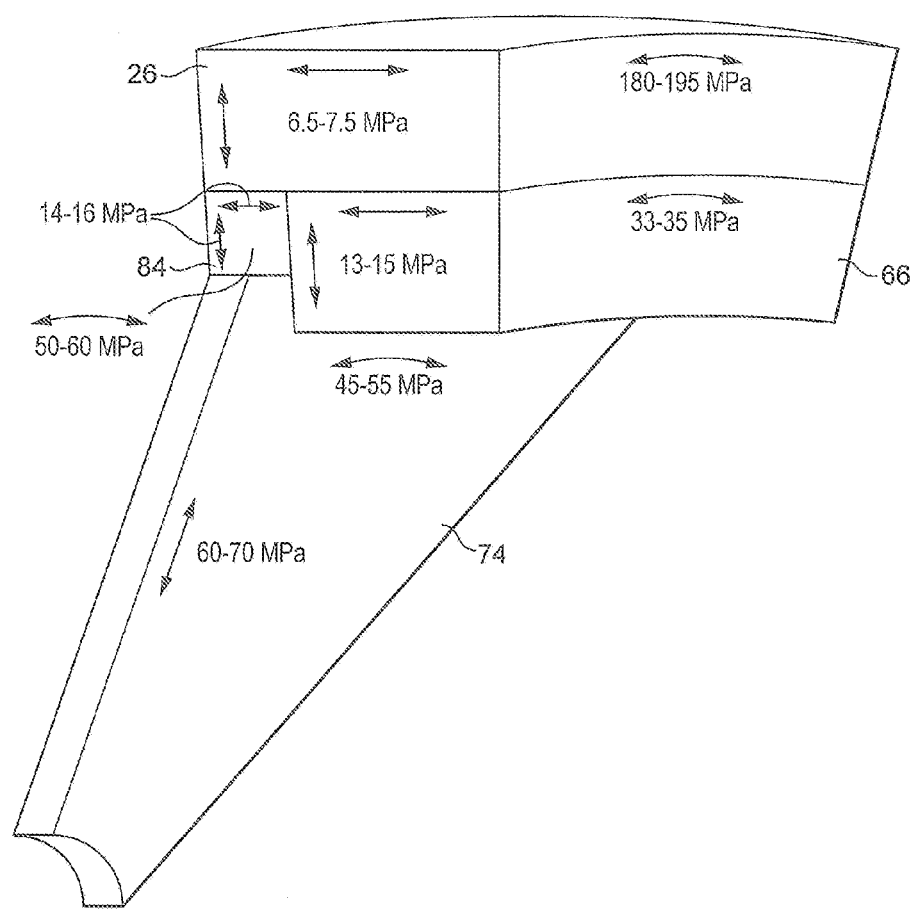
FIG. 4 is a cross-sectional view of part of the flywheel assembly of FIG. 1, with preferred strength values added.

FIG. 4 includes indication of strength values for the rotor 26, annulus 66, ring 84 and end cap 76 according to one embodiment of the present invention.

As shown in FIG. 4, the hoop tensile strength of the outer rotor 26 in this embodiment is relatively high, around 180 to 195 MPa so that it can withstand the loads experienced during rotation at high speed. In contrast, the hoop tensile strength of the ring 84 is relatively low (around 50 to 60 MPa), and is similar to the hoop strength of the end cap (around 45 to 55 MPa).

The elasticity of the ring 84 in the circumferential direction is greater than that of both the outer rotor and the end cap. This facilitates the press fitting of the ring onto the end cap, and in turn the press fitting of the ring and end cap combination into the rotor.

The radial (and axial) transverse compressive strength of the ring (14 to 16 MPa) is greater than that of the rotor (6.5 to 7.5 MPa), but less than the tensile strength of the end cap (60 to 70 MPa) in the radial direction. The ring is therefore tougher than the rotor in the radial direction, and prevents the much harder end cap perimeter digging into and damaging the relatively soft rotor during assembly.

The transverse compressive strengths of the rotor and inner annulus in the axial direction are relatively low (6.5 to 7.5 MPa and 13 to 15 MPa, respectively). The hoop tensile strength of the inner annulus is lower than that of the outer rotor, at around 33 to 35 MPa.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A flywheel assembly having a longitudinal axis and comprising an annular rotor and a rotor support for coupling the rotor to an axial shaft, wherein:
   the rotor comprises fibres in a matrix material,
   a ring comprising fibres in a matrix material is mounted on an outer circumferential surface of the rotor support and the rotor is mounted on an outer circumferential surface of the ring,
   the rotor, rotor support and ring each having longitudinal axes which are coincident with the longitudinal axis of the assembly,
   wherein the outer circumferential surface of the rotor support has a chamfer to assist fitting of the rotor support into the ring, and
   further wherein the chamfer defines a lead in angle of 15° or less with respect to the longitudinal axis of the rotor support.

2. An assembly of claim 1, wherein the ring has a greater elasticity than the rotor in a circumferential direction.

3. An assembly of claim 1, wherein the ring has a greater elasticity than the rotor support in a circumferential direction.

4. An assembly of claim 1, wherein the ring is mounted on an outermost circumferential surface of the rotor support.

5. An assembly of claim 1, wherein the rotor support is press-fitted into the ring.

6. An assembly of claim 1, wherein the ring is press-fitted into the rotor.

7. An assembly of claim 1, wherein an interface between the rotor support and the ring intersects with a transverse plane that also intersects with an interface between the ring and the rotor.

8. An assembly of claim 1, wherein the ring has a greater radial compressive strength than the rotor.

9. An assembly of claim 1, wherein the ring has a lower radial compressive strength than the rotor support.

10. An assembly of claim 1, wherein the fibres of the ring comprise glass fibres, basalt rock fibres and carbon fibres.

11. An assembly of claim 1, wherein the ring has an interference fit around the rotor support.

12. An assembly of claim 1, wherein the rotor has an interference fit around the ring.

13. An assembly of claim 1, wherein the rotor support defines a frusto-conical inner surface, which is rotationally symmetrical about its longitudinal axis.

14. An assembly of claim 13, wherein an angle defined by the frusto-conical inner surface of the rotor support with respect to a plane perpendicular to its longitudinal axis is selected so that elastic deformation of the rotor support during rotation matches that of the ring.

15. An assembly of claim 14, wherein the angle is in a range from 17 to 26°.

16. An assembly of claim 13, wherein the outer circumferential surface of the ring defines an outer cylindrical surface, and the rotor support and the ring are configured such that an imaginary surface defined by outwardly projecting the frusto-conical inner surface of the rotor support extends through the ring from its inner circumferential surface to meet the outer cylindrical surface of the ring.

17. An assembly of claim 1, wherein the outer circumferential surface of the ring has a chamfer to assist fitting of the ring into the rotor.

18. An assembly of claim 17, wherein the chamfer defines a lead in angle of 15° or less with respect to the longitudinal axis of the ring.

19. An assembly of claim 1, wherein an inner circumferential surface of the ring has a chamfer to assist fitting of the rotor support into the ring.

20. An assembly of claim 1, including an inner annulus mounted on an inwardly facing surface of the rotor.

21. An assembly of claim 20, wherein the inner annulus includes particles of magnetic material.

22. An assembly of claim 20, wherein an outer circumferential surface of the inner annulus has a chamfer to assist fitting of the inner annulus into the rotor.

23. An assembly of claim 22, wherein the chamfer defines a lead in angle of 15° or less with respect to a longitudinal axis of the inner annulus.

24. An assembly of claim 22, wherein a volume defined by an inner circumferential surface of the rotor, the chamfer of the rotor support and the chamfer of the inner annulus is filled with a bonding material.

25. An assembly of claim 24, wherein the bonding material is a resin material.

26. An assembly of claim 20, wherein an edge at each end of an inner circumferential surface of the inner annulus has a chamfer which defines an angle in the range from 20 to 60° with respect to the inner circumferential surface of the inner annulus.

27. An assembly of claim 26, wherein the chamfer at each end of the inner circumferential surface of the inner annulus defines an angle in a range from 50 to 55° with respect to the inner circumferential surface of the inner annulus.

28. An assembly of claim 1, wherein the rotor support is bonded to the ring using a resin material.

29. An assembly of claim 1, wherein the rotor is bonded to the ring using a resin material.

30. A method of manufacturing a flywheel assembly, the assembly comprising an annular rotor, a rotor support for coupling the rotor to a support shaft, and a ring, wherein the rotor and the ring comprise fibres in a matrix material, the ring is mounted on an outer circumferential surface of the rotor support and the rotor is mounted on an outer circumferential surface of the ring, the method comprising:
press-fitting the rotor support into the ring.

31. A method of claim 30, wherein the outer circumferential surface of the rotor support is press-fitted into the ring.

32. A method of claim 30, including press-fitting the ring into the rotor.

33. A method of claim 32, wherein the rotor support is press-fitted into the ring and then the ring is press-fitted into the rotor.

34. A method of claim 30, wherein an interface between the rotor support and the ring intersects with a transverse plane that also intersects with an interface between the ring and the rotor.

35. A method of claim 30, including press-fitting an inner annulus onto an inwardly facing surface of the rotor.

36. A method of claim 30, including incorporating bonding material between the outer circumferential surface of the rotor support and the ring.

37. A flywheel assembly having a longitudinal axis and comprising an annular rotor and a rotor support for coupling the rotor to an axial shaft, wherein:
the rotor comprises fibres in a matrix material,
a ring comprising fibres in a matrix material is mounted on an outer circumferential surface of the rotor support and the rotor is mounted on an outer circumferential surface of the ring,
the rotor, rotor support and ring each having longitudinal axes which are coincident with the longitudinal axis of the assembly,
an inner annulus is mounted on an inwardly facing surface of the rotor, and
an outer circumferential surface of the inner annulus has a chamfer to assist fitting of the inner annulus into the rotor.

38. An assembly of claim 37, wherein the chamfer defines a lead in angle of 15° or less with respect to the longitudinal axis of the inner annulus.

39. An assembly of claim 37, wherein the outer circumferential surface of the rotor support has a chamfer to assist fitting of the rotor support into the ring, and
wherein a volume defined by an inner circumferential surface of the rotor, the chamfer of the rotor support and the chamfer of the inner annulus is filled with a bonding material.

40. An assembly of claim 39, wherein the bonding material is a resin material.

41. A flywheel assembly having a longitudinal axis and comprising an annular rotor and a rotor support for coupling the rotor to an axial shaft, wherein:
the rotor comprises fibres in a matrix material,
a ring comprising fibres in a matrix material is mounted on an outer circumferential surface of the rotor support and the rotor is mounted on an outer circumferential surface of the ring,
the rotor, rotor support and ring each having longitudinal axes which are coincident with the longitudinal axis of the assembly, and
the rotor is bonded to the ring using a resin material.

* * * * *